Figure 1:
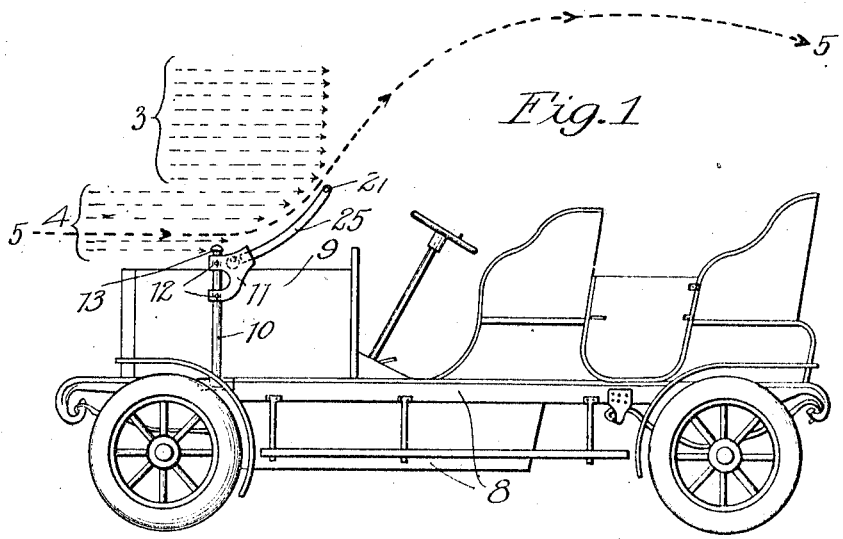

W. H. WINSLOW.
WIND SHIELD FOR VEHICLES.
APPLICATION FILED MAR. 7, 1908.

978,254.

Patented Dec. 13, 1910.

2 SHEETS—SHEET 1.

Witnesses
George C. Higham.
Frank J. Thelen

Inventor
William Herman Winslow
By Brown & Williams
Attorneys

W. H. WINSLOW.
WIND SHIELD FOR VEHICLES.
APPLICATION FILED MAR. 7, 1908.
978,254.
Patented Dec. 13, 1910.
2 SHEETS—SHEET 2.
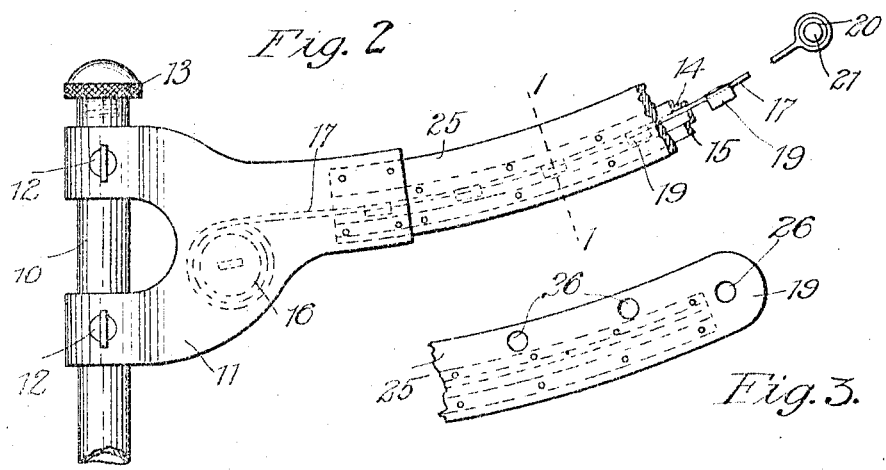
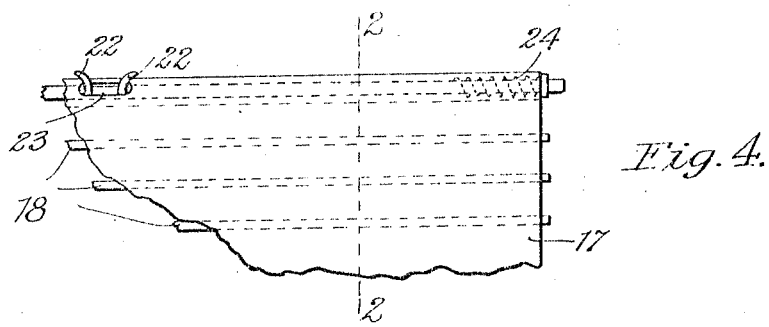
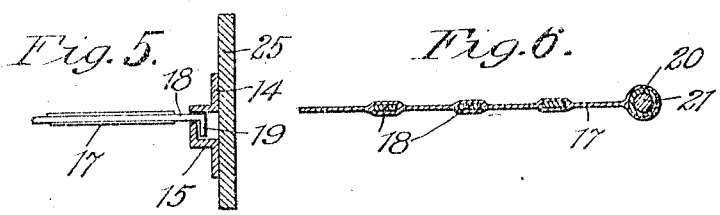
Witnesses
George C. Higham.
Frank J. Thelen
Inventor
William Herman Winslow
By Browne & Williams
Attorneys

UNITED STATES PATENT OFFICE.

WILLIAM HERMAN WINSLOW, OF CHICAGO, ILLINOIS, ASSIGNOR TO THE STEAM POWER DEVICES COMPANY, OF CHICAGO, ILLINOIS, A CORPORATION OF ILLINOIS.

WIND-SHIELD FOR VEHICLES.

978,254.  Specification of Letters Patent.  Patented Dec. 13, 1910.

Application filed March 7, 1908. Serial No. 419,641.

*To all whom it may concern:*

Be it known that I, WILLIAM HERMAN WINSLOW, a citizen of the United States, residing at Chicago, in the county of Cook and State of Illinois, have invented a certain new and Improved Wind-Shield for Vehicles, of which the following is a full, clear, concise, and exact description, reference being had to the accompanying drawings, forming a part of this specification.

My invention has for its object an improved means for deflecting air currents from moving vehicles so as to afford protection for the occupants.

In the past it has frequently occurred that the occupants of rapidly moving vehicles, as automobiles, &c., have been subject to considerable annoyance and discomfort as a result of the force of the air currents directed against them as the automobile or other vehicle was rapidly propelled through the air. Similar difficulty has been experienced by engineers in driving locomotives at high rates of speed, and it is the object of this invention to provide an improved means for protecting engine drivers, the occupants of automobiles and those traveling in a similar manner, from the annoyance and discomfort described without subjecting the vehicle to the serious retardation incident to devices heretofore used for accomplishing this purpose.

Generally speaking, my invention consists in locating a curved deflector in such a position on the front part of the vehicle as to direct upward and to the rear a column of air located just below the occupant of the vehicle to be protected. Normally, without the use of my deflector, a second column of air would be directed by the motion of the vehicle, or by wind that might be blowing at the time, against the particular location in line with which the driver of the vehicle or some of the passengers might be. The effect of my deflector upon the first mentioned column of air is, by directing it upward and to the rear, to also deflect the second column of air, with the result that the two columns combined form a resultant air current upward and to the rear over the heads of the driver or passengers of the vehicle, leaving them in comparatively calm air. It will be understood, of course, that by this means dust and any light particles of dirt or rubbish, small flies, insects, &c., will also be deflected and prevented from annoying or injuring the driver or occupants of the vehicle.

While my invention is particularly applicable to automobiles, it still has a very useful field in connection with other moving vehicles, as locomotives, railroad trains, &c.

The several drawings illustrating my invention are as follows:

Figure 1 is a side view of an automobile showing my invention attached thereto, and in this figure are also shown diagrammatically the direction of the various air currents; Fig. 2 is a detail side view of one of the supporting standards and brackets used for the deflector shown in Fig. 1; Fig. 3 is a detail side view of the upper end of one of the curtain guideway bars; Fig. 4 is a face view of a portion of the deflecting curtain used in connection with the modification of my invention shown in Fig. 1; Fig. 5 is a sectional view taken along the dotted line 1—1 in Fig. 4; and Fig. 6 is a sectional view taken along the dotted line 2—2 in Fig. 6.

Similar numerals refer to similar parts throughout the several views.

Referring to the drawings,—As shown in Fig. 1, a standard 10 is supported on either side of the hood 9 from the framework 8, and each standard supports a bracket 11, as indicated, from which guide bars 25, extending upwardly and to the rear, are also supported. The brackets 11—11, as better shown in Fig. 4, are provided with set screws 12—12 by which they may be clamped in any desired position upon the standards 10—10, and, if desired, may be removed from these standards by removing the caps 13—13 from the upper ends of such standards. Each guide bar has secured to it an angle 14 and a Z-bar 15 so bent and secured to such guide bar as to form a curved slot conforming to the curve of the guide bar and of a cross section indicated in Fig. 7. The brackets 11—11 are adapted to support a spring roller 16 transversely of the automobile and over the hood 9. This roller has secured thereto a curtain 17 constructed of any suitable flexible material, and reinforced at intervals by transverse stiffeners 18 having bent ends 19 adapted to engage the curved guideways supported by the guide bars 25—25. I find that a very suitable material for constructing curtains for this purpose is oiled silk. The tube 20 is fastened across the outer end of the curtain 17, and in this tube are arranged to be moved longitudinally two rods 21—21 terminating near the center of the tube in finger holds 22—22, projecting through a slot 23 in the tube 20. Springs 24—24 normally cause the rods 21—21 to project a short distance outside of the ends of the tube 20.

From the construction just described, it is apparent that the curtain 17 may be drawn off from the roller 16 against the resistance of the spring contained therein by gripping the finger holds 22—22 and pulling the curtain and its stiffeners in the guideways carried by the bars 25 until the tube 20 and outer end of the curtain are brought to the position desired, in which position the outer end may be secured by means of holes 26—26 in the guide bars 25—25 adapted to receive the outer ends of the rods 21—21, when the finger holds 22—22 are released. In some cases it is not necessary to have the deflector drawn out as far as in other cases, and for this reason a plurality of holes 26 are provided to facilitate any desired adjustment. The roller 16 is so supported from the brackets 11—11 as to be readily removable therefrom when desired in order that the roller and curtain, as well as the guide bars and brackets, may be entirely removed from the standards 10—10 and stored in the automobile when it is not desired to use the deflector.

The operation of my deflector will be understood by reference to Fig. 1, in which different air currents are indicated by dotted arrows. A first column of air 4 may be considered as directly in front of the deflector, as a result of which such column 4 is necessarily displaced by the direct action of the deflector as the automobile moves along. A second air column 3 may be considered as located immediately above the column 4, the column 3 occupying such a position that if not diverted it would pass above the deflector, hood and dashboard and strike directly against the driver of the automobile and the passengers. It has been ascertained, however, that the effect of the deflected air column 4 upon the air column 3 is to produce a resultant air current represented by the curved dotted line 5—5, which will be seen to have the form of a reversed curve. The result of this is that the occupants of the automobile are almost completely protected from moving air currents, and that this is accomplished without producing a vacuum or local eddy currents, as would be the case were a perpendicular shield used over the dashboard.

It has been found by repeated experiment that the deflector should preferably not be continued to a point tangent to a vertical line, but that the tangent at the upper point of the deflector should be directed upward and to the rear, in order that the deflected air current may have a considerable component in a direction toward the rear of the vehicle. The forward end of the deflector should preferably be tangent to a horizontal line, and a very efficient form of curve has been demonstrated to be an arc of a circle. Experiment has demonstrated that if the deflector be continued until the upper end is tangent to a vertical line the resulting deflected air currents will produce local eddy currents which will have a tendency to both produce a partial vacuum and to also seriously impede the motion of the vehicle.

A particular advantage of my invention in connection with its application to automobiles is the effect produced upon the dust usually raised by the wheels and eddy currents at the rear of the automobile. The resulting air current directed over the automobile has the effect of suppressing or blanketing the dust and preventing it from being drawn by the eddy currents, otherwise effective, into the rear end of the automobile.

It should be pointed out that it is immaterial, in the operation of my invention, whether the air currents diverted by the deflector be due to the motion of the vehicle or to wind, or to a combination of both.

While I have shown my invention in the particular embodiment herein disclosed, I do not, however, limit myself to this particular construction, but claim broadly any equivalent means for accomplishing this result.

What I claim is:

1. In combination with an automobile, a standard supported from the framework on either side of the hood, an adjustable bracket supported from each standard, a spring roller supported transversely of the automobile above the hood between such brackets, a flexible curtain carried by such roller, curved guideways supported from such brackets, transverse reinforcing strips in such curtain having ends adapted to engage such guideways, such curtain when extended constituting a deflector extending upward and to the rear and adapted to direct air currents in the same direction over the seats of the automobile, a bar secured across the outer end of such curtain, and means carried by such bar for engaging the guideways at any desired points.

2. In combination with an automobile, a standard supported from the framework on either side of the hood, an adjustable bracket supported from each standard, a spring roller supported transversely of the automobile above the hood between such brackets, a flexible curtain carried by such roller, curved guideways supported from such brackets, transverse reinforcing strips in such curtain having ends adapted to engage such guideways, such curtain when fully extended being wholly below the line of sight of the driver, such curtain when extended constituting a deflector extending upward and to the rear and adapted to direct air currents upward and to the rear, whereby air currents that would otherwise strike the driver are directed upward and over his head.

3. In combination with an automobile, a standard supported from the framework on either side of the hood, a bracket supported from each standard, a roller supported between such brackets, a flexible curtain carried by such roller, curved guideways for such curtain supported from such brackets, and means for securing the outer end of such curtain in any desired position on such guideways.

4. In combination with an automobile, a standard supported from the framework on either side of the hood, a bracket supported from each standard, a roller supported between such brackets, a flexible curtain carried by such roller, curved guideways for such curtain supported from such brackets, means whereby said guideways may positively retain such curtain against lateral movement, and means for securing the outer end of such curtain in any desired position on such guideways.

In witness whereof, I hereunto subscribe my name this 4th day of March, A. D. 1908.

WILLIAM HERMAN WINSLOW.

Witnesses:
LEONARD W. NOVANDER,
ALBERT C. BELL.